Feb. 7, 1950 K. M. HAMMELL 2,496,715
THERMOSTATIC CONTROL MECHANISM
Filed Feb. 7, 1945
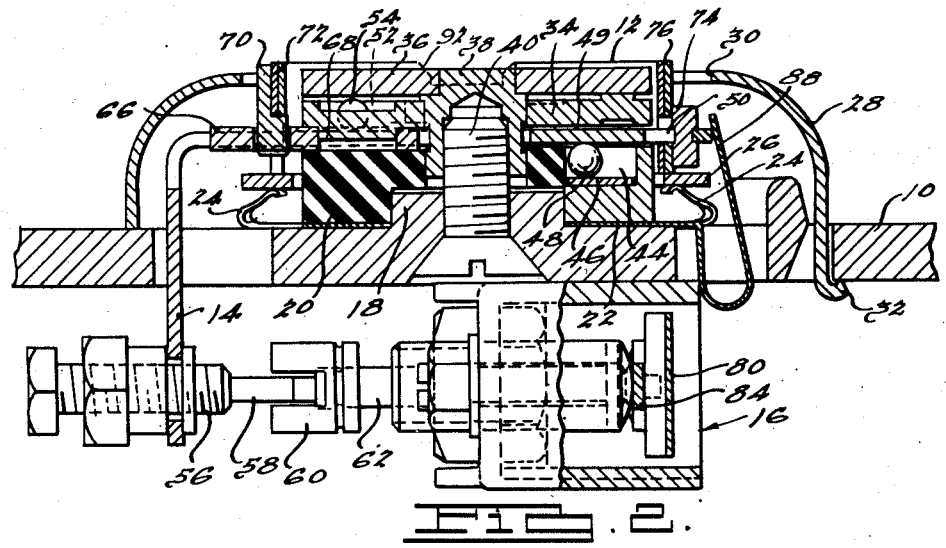
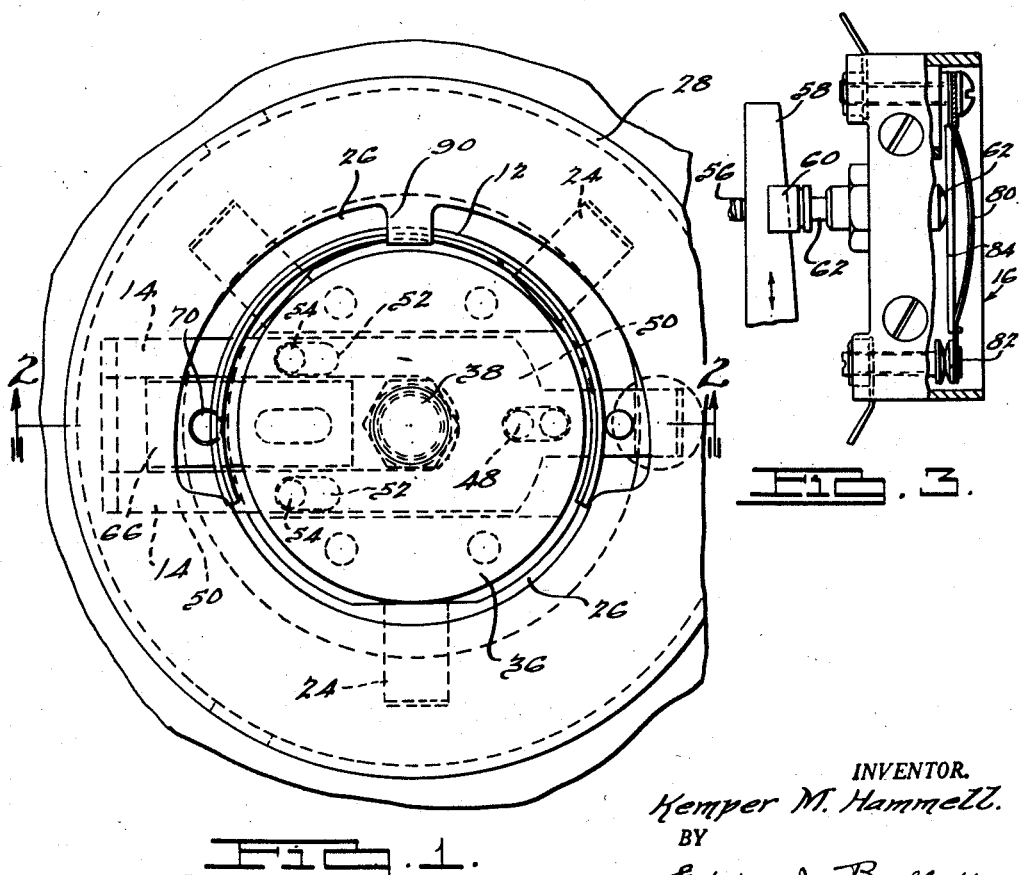
INVENTOR.
Kemper M. Hammell.
BY
Edwin J. Balluff
ATTORNEY.

Patented Feb. 7, 1950

2,496,715

UNITED STATES PATENT OFFICE 2,496,715

THERMOSTATIC CONTROL MECHANISM

Kemper M. Hammell, Detroit, Mich., assignor to Eureka Williams Corporation, a corporation of Michigan Application February 7, 1945, Serial No. 576,670

8 Claims. (Cl. 200—138)

This invention relates to thermostatic control mechanisms and has particular reference to a mechanism of this type which is constructed and arranged to respond quickly and accurately to a temperature condition for the purpose of regulating or controlling the same.

While the invention is susceptible to numerous applications, as illustrated in the drawings it is particularly adapted for use in connection with a cordless electric iron, for example, in an organization like that disclosed in Chereton Patent No. 2,284,132, issued May 26, 1942, for "Electric ironing device."

Principal objects of the invention are to provide:

A sensitive and efficient thermostatic control mechanism;

A thermostatic control mechanism which is constructed and arranged to respond to the temperature of the device bearing thereagainst and which is substantially free of the load of said device;

A thermostatic control mechanism in which the thermo-responsive element thereof is resiliently mounted so as to be capable of being more efficiently pressed into thermal engagement with a device the temperature of which is to be controlled.

Other and further objects of the invention will be apparent from the following description and claims and will be understood by reference to the accompanying drawings, of which there is one sheet, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a plan view of a mechanism embodying the invention;

Fig. 2 is a sectional view thereof along the line 2—2 of Fig. 1; and

Fig. 3 is a bottom plan view of the switch assembly.

The thermostatic control mechanism embodying the invention may be mounted upon a suitable base or stand 10 and include generally a thermo-responsive bimetallic element 12, a slide 14 adapted to be shifted by the thermo-responsive element 12, and a switch indicated generally at 16 which is adapted to be opened and closed by the thermostat control mechanism for controlling the circuit which controls the supply of current to the heating element of the device to be controlled.

The base 10 is provided with an annular boss 18 which functions to locate an insulator block 20, the block 20 being provided with a recess complementary to the shape of the boss 18 for receiving the same. A spring comprising a washer-like element 22 is supported upon the base 10 and located by the boss 18. This spring includes a plurality of spring fingers 24 disposed around the periphery of the insulator block 20 and forming a resilient support for a washer or collar 26. The thermo-responsive element 12, which may comprise a semicircular strip of bimetal, has one of its circular edges resting upon the collar 26. An annular guard 28 provided with a central opening 30 surrounds and encloses the mechanism and is detachably secured to the base 10 by means of several tabs 32 which project through suitable holes in the base 10 and engage the underside thereof.

The bimetallic element 12 has its upper edge projecting a short distance above the upper edge of the guard 28 so that a device whose temperature is to be controlled, such as an iron, may have its sole plate contact the bimetallic element 12.

An annular washer-like spacer 34 is supported on the insulating block 20 and a metallic rest plate 36 is arranged above the spacer 34. The rest plate 36 has a screw cap 38 affixed to the center thereof and this screw cap 38 projects downwardly through suitable openings in the spacer 34 and insulating block 20 and receives the threaded end of a screw 40, the head of which is countersunk in the underside of the base for clamping the aforementioned parts in assembled relationship.

The upper surface of the rest plate 36 is substantially flat and forms at least part of a support for a device to be heated whose temperature is to be controlled. The upper surface of the rest plate 36 is slightly above the top of the guard 28 but below the upper edge of the bimetallic element 12, as illustrated in Fig. 2. However, when a device whose temperature is to be controlled is resting upon the support 36, the spring fingers 24 will deflect sufficiently to displace the bimetallic element 12 sufficiently so that the weight of the device to be heated is supported by the rest plate 36. The springs 24 thus function to resiliently urge the upper edge of the bimetal element into contact with the surface of the device to be heated but with a relatively light pressure.

The insulator block is recessed to provide a pocket 44 for accommodating a plate 46 and a ball 48. The ball 48 forms a rolling support for a horizontally extending portion 50 of the slide 14. The insulating block 20 and the spacer 34 are constructed and arranged relative to each other so as to provide a slot 49 therebetween through which the horizontal part 50 of the slide is freely reciprocable within limits.

The spacer 34 is provided with a pair of recesses forming pockets 52 above the horizontal part 50 of the slide, each for receiving a ball 54. In this way the balls 54 roll upon the top of the horizontal part 50 of the slide 14, while the top of the balls 54 bear against the underside of the rest plate 36. The depending part of the slide 14 is provided with an adjustable screw 56 which bears against a wedge 58 which in turn bears against a shoe 60 carried on a pin or plunger 62 of the switch 16. The slide 14 thus is supported by the balls 48 and 54 and by the wedge 58, the balls 48 and 54 providing a rolling support for the slide so as to reduce frictional losses.

The horizontal part 50 of the slide 14 is bifurcated as illustrated in dotted line in Fig. 1 so as to straddle the screw 38 and a plate 66. The plate 66 is clamped between the spacer 34 and the insulator block 20, the spacer 34 having a boss 68 which projects into a hole in the plate 66 for locating and securing the same. The plate 66, as well as the horizontal part 50 of the slide 14, extends through a cutout part of the semicircular bimetal element 12. The left hand side (Fig. 2) of bimetallic element 12 is provided with a pin 70 which extends loosely through a hole in plate 66 and cooperates therewith to form a stop or rest against which one side 72 of the bimetal element reacts. The horizontal part 50 of the slide which projects beyond the bimetal element 12 on the righthand side thereof (Fig. 2) is provided with a pin 74 which forms a stop or rest against which the other side 76 of the bimetal 12 reacts.

Thus, when the bimetal expands under the influence of heat, its diameter (that is, the distance between 72 and 76) increases, thereby bearing against the pin 74 and moving the slide 14 to the right. As the slide 14 moves to the right, it acts through the screw 56, the wedge 58, the shoe 60, the pin 62, and the lever 84 to move the spring arm 80 carrying the movable contact 82 of the switch 16 to open the switch 16, thereby shutting off the flow of current to the heating element of the device which is in contact with the bimetal element 12.

The sping arm 80 of switch 16 tends to maintain the contacts of the switch closed. This spring arm 80 reacting through the lever 84, slidable pin 62, the shoe 60, the wedge 58, and the screw 56 functions to help move the slide 14 to the left as the bimetallic element cools down. If desired, a spring finger 88 formed integrally with the plate 22 may be provided to bear against the righthand side of the horizontal part 50 of the slide 14 to bias it to the left as the bimetallic element 12 cools down or contracts in order to permit the switch contacts to close. The switch 16 is suitably mounted on the underside of the base.

The wedge 58 is provided so that the range of action of the thermostat may be varied so as to open and close the switch at different temperatures. The construction and operation of a wedge like that illustrated at 58 is more clearly illustrated in the aforesaid Patent No. 2,284,132.

A tab formed integrally with the guard 28 projects inwardly of the opening 30 therein and through a cutout part 92 of the bimetallic element 12 to aid in keeping the latter in its proper working position.

While I have illustrated and described a preferred embodiment of my invention, it is understood that this is capable of modification and I therefore do not wish to be limited to the precise details set forth but desire to avail myself of such changes and alterations which fall within the purview of the following claims.

I claim:

1. Thermostatic control mechanism for an electrically heated device whose temperature is to be controlled comprising a support, a bimetallic element mounted on said support and having an elongated edge presented and arranged for engagement with a surface of said device so that uniform contact will be maintained between said edge and said surface regardless of the degree of flexure of said element, a switch controlling member mounted for movement in response to deflection of said bimetallic element for operating a switch which controls the circuit of the means for heating said device, and yieldable means for biasing said edge for engagement with said device without offering any material resistance to the deflection of said bimetallic element.

2. Thermostatic control mechanism for an electrically heated device whose temperature is to be controlled comprising a rest forming a support for said device, a bimetallic element mounted so as to present an elongated edge for engagement with a surface of said device without subjecting said element to any material part of the load of said device and so that uniform contact will be maintained between said edge and said surface regardless of the degree of flexure of said element, and a switch controlling member mounted for movement in response to deflection of said bimetallic element for operating a switch which controls the circuit of the means for heating said device.

3. Thermostatic control mechanism for an electrically heated device whose temperature is to be controlled comprising a rest forming a support for said device, a bimetallic element mounted so as to present an elongated edge for engagement with a surface of said device without subjecting said element to any material part of the load of said device and so that uniform contact will be maintained between said edge and said surface regardless of the degree of flexure of said element, a switch controlling member mounted for movement in response to deflection of said bimetallic element for operating a switch which controls the circuit of the means for heating said device, and yieldable means for supporting said bimetallic element relative to said rest and functioning to position said edge thereof projecting from said rest when said rest is not supporting said device.

4. Thermostatic control mechanism for an electrically heated device whose temperature is to be controlled comprising a support, a bimetallic element mounted on said support and having an elongated edge presented for engagement with a surface of said device so that uniform contact will be maintained between said edge and said surface regardless of the degree of flexure of said element, a switch controlling member mounted for movement in response to deflection of said bimetallic element for operating a switch which controls the circuit of the means for heating said device, yieldable means for biasing said edge for engagement with said device without offering any material resistance to the deflection of said bimetallic element, and anti-friction means for supporting said member for free sliding movement.

5. Thermostatic control mechanism comprising a support, a bimetallic element resiliently mounted on said support and having an elongated edge presented for engagement with a device whose temperature is to be controlled, and a switch actuating slide member mounted on said support for movement in response to deflection of said bimetallic element for operating a switch.

6. Thermostatic control mechanism comprising a support, a bimetallic element resiliently mounted on said support and having an elongated edge presented for engagement with a device whose temperature is to be controlled, a switch actuating slide member mounted on said support for movement in response to deflection of said bimetallic element for operating a switch, and rolling means for supporting said slide member for movement in response to deflection of said bimetallic element.

7. Thermostatic control means comprising a support having a rest for a device whose temperature is to be controlled, a curved bimetallic element arranged with a longitudinal edge thereof projecting beyond said rest for engagement with said device, yieldable means for supporting said bimetallic element without offering any material resistance to the deflection of said bimetallic element, a switch actuating member positioned relative and loosely connected to said bimetallic element for movement in response to deflection of said bimetallic element, and rolling means for supporting said member for movement in response to said bimetallic element.

8. Thermostatic control mechanism for an electrically heated device whose temperature is to be controlled comprising a bimetallic element having an elongated edge presented and arranged for engagement with a surface of said device so that substantially uniform contact will be maintained between said edge and said surface regardless of the degree of flexure of said element, a switch controlling member mounted for movement in response to deflection of said element for operating a switch which controls the circuit of the means for heating said device, and means providing a universal mounting of said element which will permit said edge thereof to adjust itself to the plane of the said surface of said device.

KEMPER M. HAMMELL.

REFERENCES CITED

The following references are of record in the file of this patent:

UNITED STATES PATENTS

| Number | Name | Date |
|---|---|---|
| 794,580 | Ayer | July 11, 1905 |
| 1,723,965 | Behringer | Aug. 6, 1929 |
| 1,735,088 | Penner | Nov. 12, 1929 |
| 1,931,238 | Phelan | Oct. 17, 1933 |
| 2,140,479 | Myers et al. | Dec. 13, 1938 |